INVENTORS
PANFILIO A. DI VALERIO
WILLIAM A. SKURA
JOHN E. O'DONNELL
BY *James R. Hulen*
ATTORNEY.

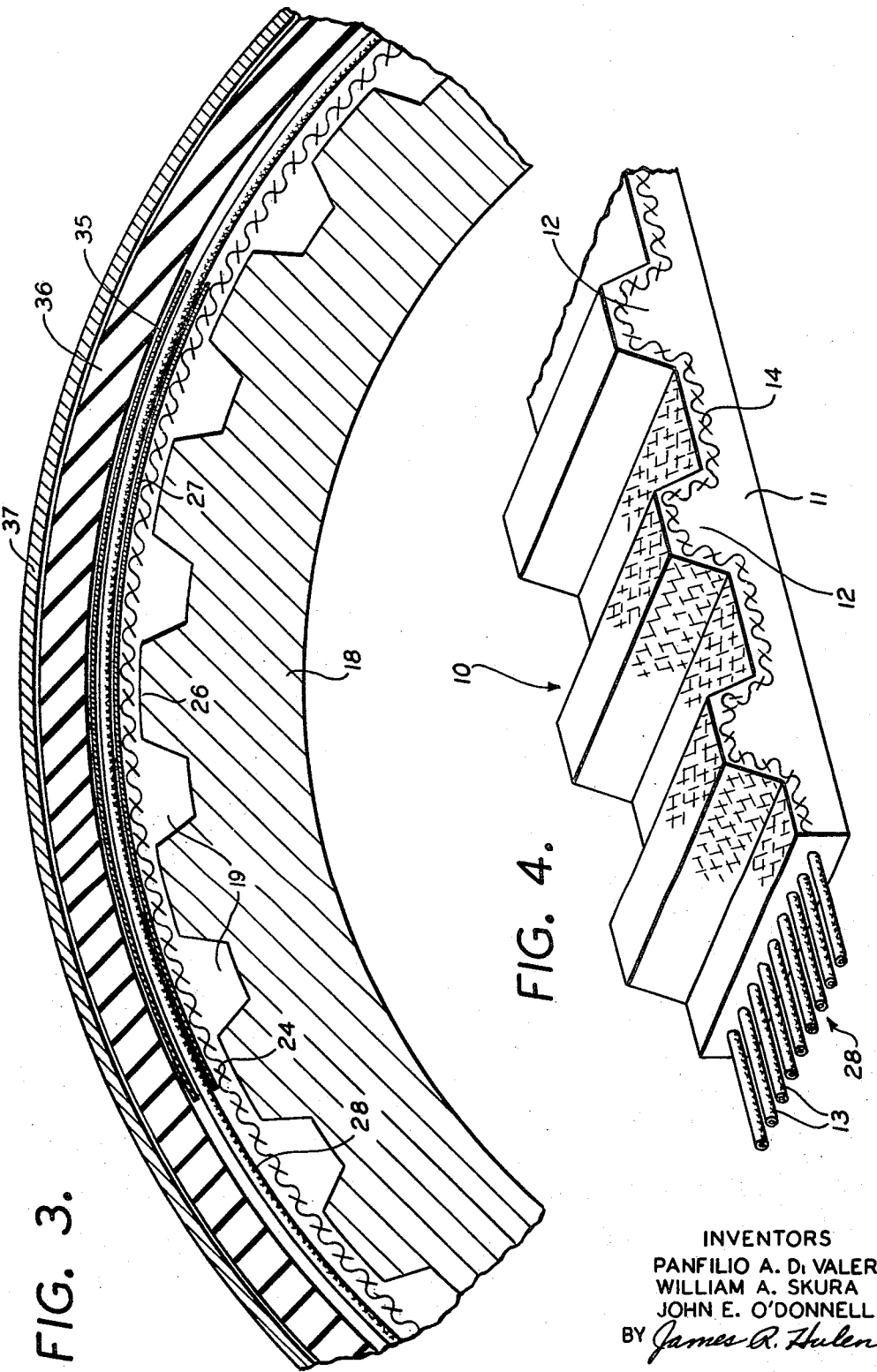

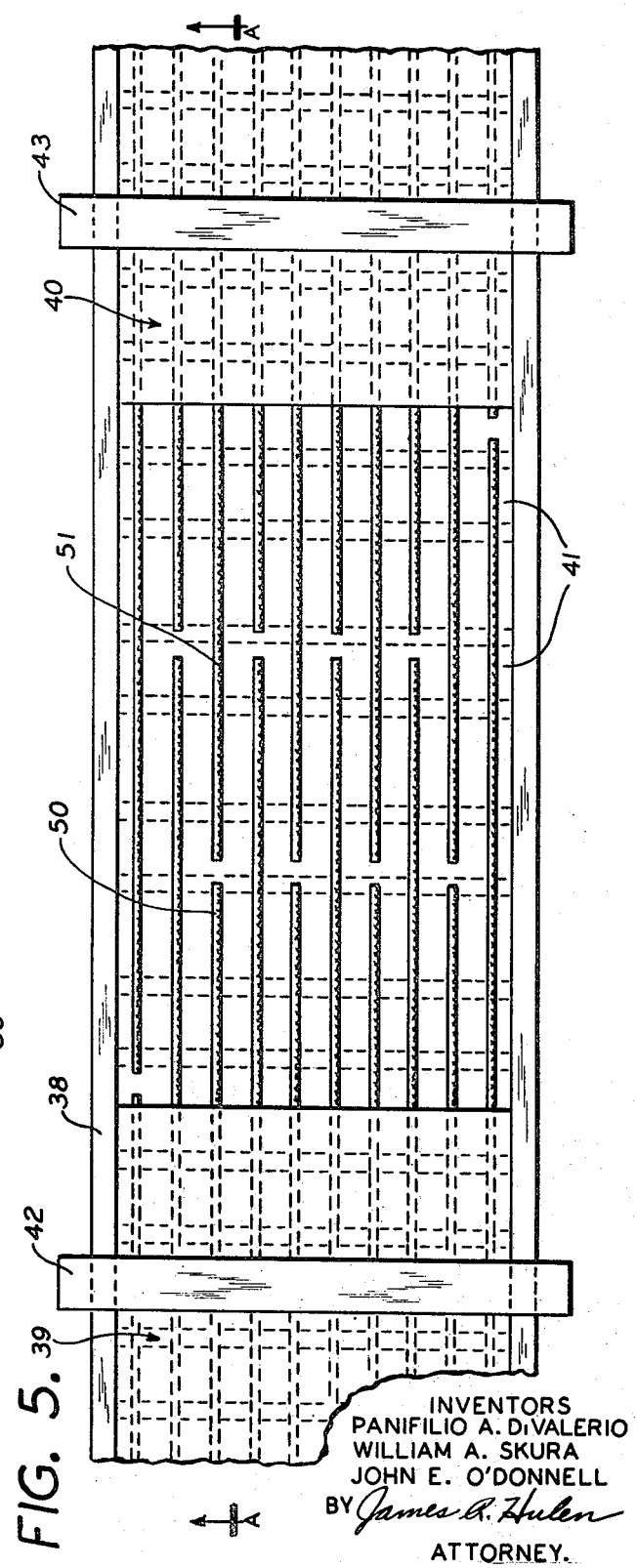
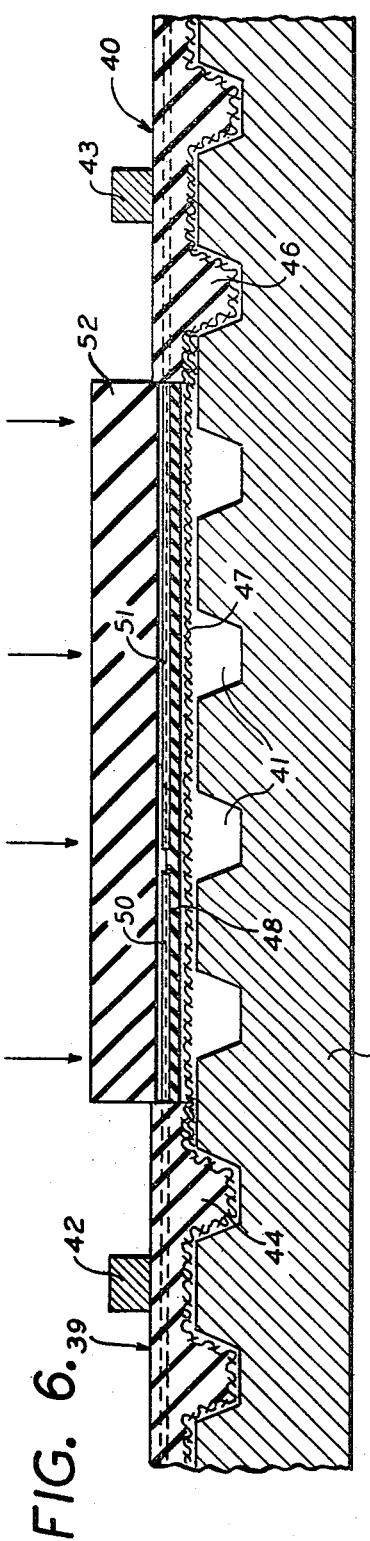

United States Patent Office 3,419,449
Patented Dec. 31, 1968

3,419,449
METHOD OF MAKING TRANSMISSION BELTS
Panfilio A. Di Valerio, Ardmore, Pa., William A. Skura, Audubon, N.J., and John E. O'Donnell, Warminster, Pa., assignors to Uniroyal, Inc., a corporation of New Jersey
Filed Aug. 2, 1965, Ser. No. 476,433
12 Claims. (Cl. 156—159)

This invention relates to a method of making positive drive toothed belts and, more particularly, to a method of making exceptionally long toothed belts.

Since the advent of the positive drive toothed belt, which belt is described and claimed in U.S. Patent No. 2,507,852, issued on May 16, 1950, to R. Y. Case, various methods have been used to manufacture the belts. The most successful of these methods is disclosed in U.S. Patent No. 3,078,206, issued on Feb. 19, 1963, to W. A. Skura, a joint-inventor of the subject invention.

To practice the method of the last-mentioned patent, the belt components are built up on a cylindrically shaped mold and an endless belt band is then formed. The belt band is later cut into individual endless belts having the desired width and length. Most other successful toothed belt manufacturing methods are similar, in that a cylindrically shaped mold is used to form the endless belts.

Presently, there is an increasing need for positive drive toothed belts of greater and greater lengths. It has been found to be very impractical to construct these exceptionally long belts on conventional cylindrical molds, since the molds, required for long belts would necessarily have to be extremely massive and the cost to produce such molds would be prohibitive.

Accordingly, it is an object of this invention to provide a method for making exceptionally long positive drive toothed belts.

Another object is to provide a new splicing technique which permits the construction of a long toothed belt from a plurality of discontinuous belt sections.

These and other objects are accomplished in accordance with this invention which comprises the steps of providing a plurality of discontinuous belt sections, each of the sections comprising a rubber body portion with spaced teeth extending transversely thereof and a plurality of tension cords embedded longitudinally in the body portion, the ends of the cords extending outwardly from the ends of the body portion; aligning the ends of the belt sections so that the outermost tooth on each end of each section is spaced a predetermined distance from the outermost tooth on an adjacent section and so that the opposed pairs of corresponding cords overlap; removing portions of the cord ends in a staggered pattern so that the opposed pairs of corresponding cords no longer overlap and so that the total length of each pair of corresponding cords approximates the predetermined distance between the outermost teeth; embedding the cord ends in rubber to form an endless rubber body portion; and forming spaced transverse teeth on the body portion between the said outermost teeth.

For a better understanding of the present invention together with other and further objects thereof, reference is made to the following description, taken in connection with the accompanying drawings, and its scope will be pointed out in the appended claims.

Referring now to the drawings:

FIG. 3 is an enlarged fragmentary view of a portion of the belt mold and belt components shown in FIG. 2;

FIG. 4 is a perspective view of the end of a belt section utilized in performing the method of the present invention;

FIG. 5 is a top plan view illustrating the layout of the corresponding pairs of tension cord for the splicing operation; and FIG. 6 is a cross-sectional view showing the arrangement of the belt sections prior to the final molding operation.

Figure 1:
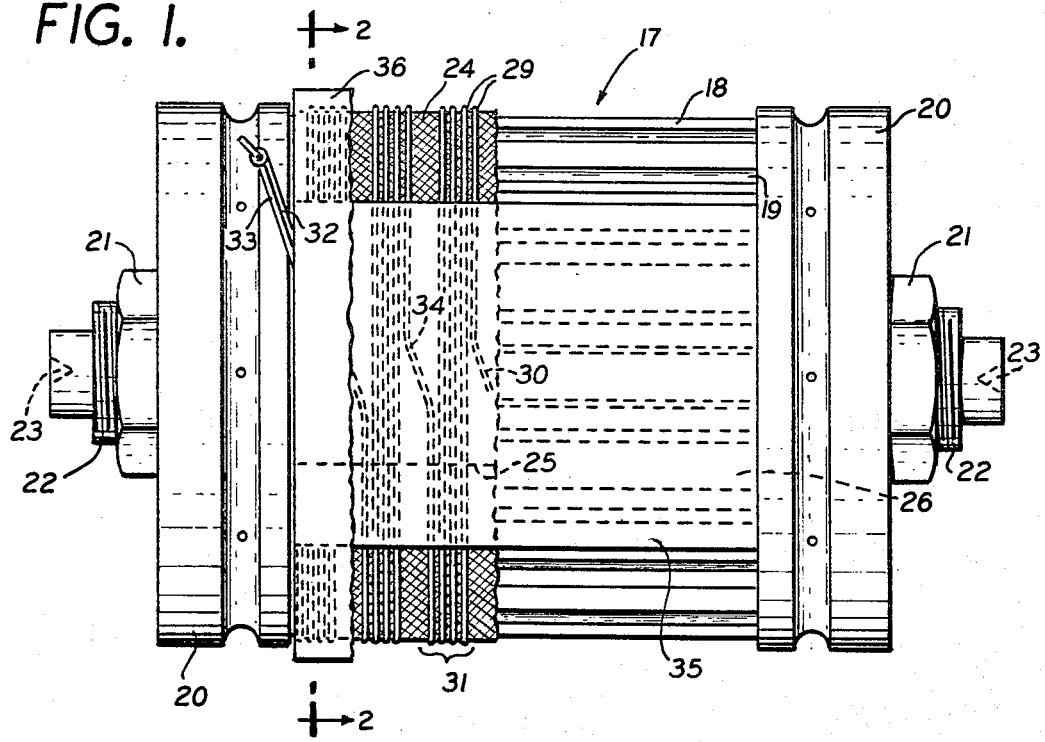
FIG. 1 is an elevational view of a belt mold with the belt parts built up thereon in readiness for the molding operation, but showing parts of the belt broken away to better illustrate the process.

As stated above, the present invention contemplates the manufacturing of exceptionally long toothed belts by first providing shorter belt sections which are later spliced together to form individual endless toothed belts.

Referring to FIG. 4, a typical belt section usable with this invention is shown generally at 10. Discontinuous belt section 10 has a rubber body portion 11 with spaced teeth 12 extending transversely thereof. A plurality of tension cords 13 are embedded longitudinally in body portion 11 and extend outwardly from the ends of the body portion. Although only one end of the belt section is shown, the other end will be substantially identical in construction. If desired a wear-resistant fabric 14 may be applied to the pulley-engaging surface of the belt section.

Figure 2:
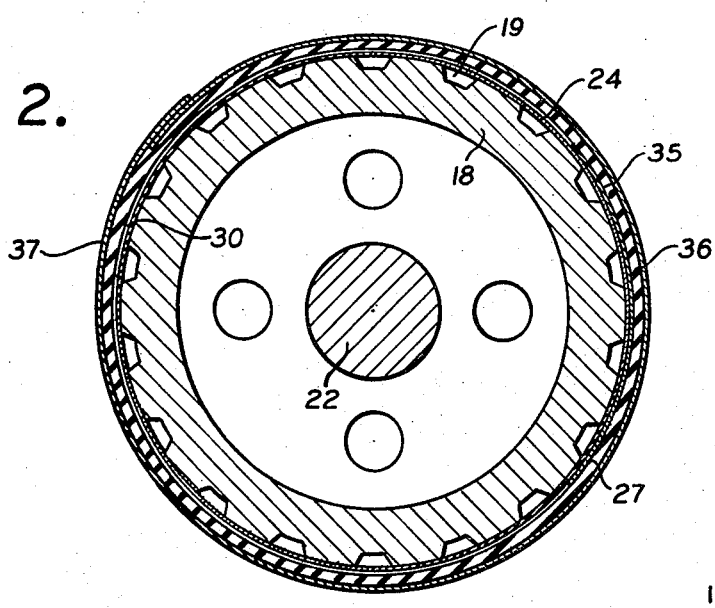
FIG. 2 is a cross-sectional view of the belt mold viewed along a line 2—2 in FIG. 1.

The preferred method for constructing belt section 10 is quite similar to the method described and claimed in the above-cited U.S. Patent No. 3,078,206. Referring to FIGS. 1 to 3, the components of belt section 10 are built up upon a mold 17 having a cylindrical body portion 18 provided with axially extending grooves 19 in its outer circumference constituting belt tooth cavities for the formation of the belt teeth 12. The body of the mold is provided with end plates 20, which are clamped to the ends of the body 18 by nuts 21 threaded on each of the ends of a spindle 22 having centering bores 23.

Prior to building the components of belt section 10 on the mold 17, the mold is placed in a conventional winding machine and centered between the winding head and the tail stock by the entrance of the centering pins of the machine into centering bores 23 of spindle 22. The mold 17 may be manually or automatically rotated by the winding machine, which will enable the operator to apply the belt components thereto. A plurality of belts are built up on the mold for each molding operation, and each of the elements of the several belt sections applied as a unit.

The method of manufacturing belts described in U.S. Patent 3,078,206 is modified for the construction of the belt sections 10 of the present invention. The toothed jacket 14 is made from a piece of stretchable fabric 24 which is wrapped circumferentially around cylindrical mold body 18 to form the wear-resistant jacket 14 of the individual belts. Preferably, the fabric is stretchable in one direction only and the stretch therein extends circumferentially of the mold. The ends of fabric 24 are united with a lap joint 25 having an overlap preferably between ⅛ and ¼ inch, placed over the ridges 26 between the grooves 19 in the outer circumference of mold body 18. Before being applied, fabric 24 is impregnated with a rubber cement. This cement remains tacky and adhesively unites lap joint 25. Fabric 24 extends across the grooves 19 and ridges 26 (see FIG. 3) and has sufficient stretch or elasticity for the portion extending over the grooves to be stretched an amount equal to the linear cross-sectional dimension of the sides and bottoms of the grooves. Preferably the elongation of fabric 24 should be 60% in order to insure that the fabric will completely conform to the shape of grooves 19, without undue strain or rupture. However, a fabric having a greater amount of elongation may be used, if desired.

Since belt section 10 is constructed with tension cords extending outwardly from the ends thereof, the present method requires that a means be provided to prohibit a segment of the tension cords from being embedded in the belt rubber. This is accomplished in accordance with the present invention by inserting a sheet metal shim 27 over fabric 24 as shown in FIG. 3 of the drawings. Shim 27 extends the width of the mold 17 and extends circumferentially of the mold a sufficient distance to cover a predetermined number of grooves 19.

Shim 27 also serves to support the load carrying band 28 which is applied on the mold by automatically winding over the fabric 24 and shim 27 a plurality of turns, or convolutions 29 of a strand 30 in groups 31, thereby forming the load carrying band 28 for each belt. Load carrying band 28 may be made from strands 30 of flexible and substantially non-stretchable material such as prestretched cord, or wire; if desired, this band may be made from other materials that are substantially in extensible but presents voids or spaces through which the rubber may flow. As shown in FIG. 1, the starting end 32 of the strand is secured with a knot on its end in a groove 33 in the left end plate 20 and the groups 31 of convolutions, or each of the load carrying bands 28 of the individual belt sections, are automatically wound over the fabric 24 with jump spaces 34 between each of the groups 31.

Referring to FIG. 3, a thin sheet of aluminum foil 35 is next placed over the wound cord in alignment with metal shim 27. Foil 35 serves the function of preventing the flow of rubber through the tension cord and into the grooves 19 located under the foil and shim. Although aluminum foil is preferred for this material, Holland cloth or any other material or combination of materials which will serve this same function may be used with the invention.

With foil 35 in position, a rubber layer 36 is applied over the convolutions of strands 30 and over the foil sheet 35. Rubber layer 36 is applied in the form of a calendered sheet and is of sufficient thickness to provide the extruded rubber for teeth 12 of belt section 10 and the rubber body portion 11 for the belt section. This thickness can be varied to adequately provide the rubber body portion 11 since only a portion of rubber 36 is extruded through the load carrying band 28. As used herein, the term "extruded rubber" and its related forms, refer to the rubber which is formed or pushed in to fill the cavity of an external mold. In order to permit the passage of the rubber 36 through the load carrying band 28, sufficient voids in the band are provided when the convolutions 29 placed around the rubber layer 36 and is held in place by the strand is between 48% and 72% of the total surface area of the band. A suitable compound for rubber layer 36 is set forth in U.S. Patent 3,078,206.

Having assembled the belt components on the mold 17, the assembly is removed from the winding machine and prepared to be placed in a steam vulcanizer (not shown) in which a portion of the rubber layer 36 is forced into the toothed cavities 19 which are not covered by metal shim 27 and foil 35, and the rubber is cured. Referring to FIGS. 2 and 3, a sheet metal collapsible sleeve 37 is placed around the rubber layer 36 and held in place by a surrounding contacting spring band (not shown).

The vulcanizer used for this operation is adequately described in U.S. Patent 3,078,206. The layer of rubber 36 is caused to conform to the exterior shape of mold body 18 by subjecting the exterior of the collapsible sleeve 37 to gaseous pressure, and permitting any trapped gases on the interior of the metal sleeve 37 to escape. Pressure is applied to the exterior of the sleeve 37 by admitting steam at approximately 100 pounds per square inch pressure into the vulcanizer. Sleeve 37 is collapsed, that is, contracted circumferentially, and any trapped gases between the interior of the collapsible sleeve 37 and the exterior cylindrical surface of mold 17 are permitted to escape through passages in the end plates 20.

The steam at 100 pounds pressure is sufficiently hot to soften rubber layer 36, and such pressure is sufficiently high to collapse sleeve 37 and force the relatively fluid rubber through the voids in the helical groups of convolutions 31 of load carrying band 28 and into the axially extending grooves 19 to form the belt teeth 12. The location of shim 27 and foil 35 over the predetermined number of grooves 19 will prohibit the rubber 36 from passing through the tension cord and into the grooves. There will thus be an area lying in the region of shim 27 and foil 35 that contains only the relatively unstretched fabric 24, the exposed cord 13 and rubber layer 36. After the uncovered grooves 19 are completely filled with rubber 36, additional heat is supplied to the vulcanizer to cure the rubber portion of the belt and to firmly bond the jacket fabric 14 to the exterior surface of the belt.

After the belt has been cured, mold 17 is removed from the vulcanizer and the molded belt band is stripped from the mold. The belt band will have a section in the region of the shim 27 and foil 35 that has no teeth formed thereon. The next step in the performance of the method of the subject invention involves the removal of shim 27 and foil 35 from the belt assembly and the removal of the unstretched fabric 24 from one side of the cords 13 and the removal of the unextruded rubber 36 from the other side of cords 13. When the above operation has been accomplished, the resulting product is an endless belt having a rubber body portion with transversely extending teeth over the majority of the length thereof and only tension cord over that rgeion that had previously been occupied by the metal shim 27 and foil 35. The endless band is then formed into the desired discontinuous belt sections 10 by severing cords 13 substantially at their midpoints. The resulting belt section is illustrated at 10 in FIG. 4. Either before or after the cords are cut, the endless band or discontinuous belt sections may be divided into the individual belt thicknesses, however, it is desirable to wait until the entire belt-making operation is completed to perform this step.

The procedure for joining two or more of the individual discontinuous belt sections to form an exceptionally long toothed belt will now be described in detail. Referring to FIGS. 5 and 6, a flat mold 38 is utilized to form the splice between a belt section shown generally at 39 and a belt section shown generally at 40. Mold 38 has tooth grooves 41 extending transversely thereof and is equipped with clamps 42 and 43 for firmly holding the ends of belt sections 39 and 40, respectively. The outermost tooth 44 on belt section 39 is placed in one of the grooves in mold 38 and the outermost tooth 46 on belt section 40 is placed in another groove in mold 38 with a predetermined number of grooves left vacant therebetween.

A stretchable fabric 47, which may be identical to fabric 24 used in the making of belt sections 39 and 40, is placed across the grooves which are left vacant between teeth 44 and 46. The ends of the fabric are preferably placed under the ends of the belt sections to prevent longitudinal slippage and may even be placed into the grooves in which teeth 44 and 46 are located. A thin layer (approximately .015 inch) of cushion stock 48 is placed over the fabric 47 in the splicing area. At this point the pairs of corresponding cords extending from the end of belt sections 39 and 40 are substantially of equal length and overlap almost over the entire length thereof. The cords extending from the end of belt section 39 are cut in a staggered pattern as illustrated in FIG. 5. There are many patterns usable with this invention and the pattern shown in FIG. 5 is merely for illustrative purposes. The corresponding cords extending from the end of belt section 40 are next cut so that the ends thereof substantially meet the corresponding cord ends extending from belt section 39. It will be apparent from the above description, that the total length of each pair of corresponding cords substantially approximates the predetermined distance between the ends of belt sections 39 and 40. For example, the total length of cord 50 extending from the end of belt section 39 and cord 51 extending from the end of belt section 40 is approximately equal to the overall distance between the belt sections.

With the cords now cut to length, they are pressed into the upper surface of cushion layer 48 which overlies fabric 47 and the tackiness of the rubber maintains the cords at a desired tension and in the desired pattern.

In the next step of the operation, a sheet of body rubber 52 is placed on top of the cords as shown in FIG. 6. Rubber 52 is essentially the same as the body rubber 36 used for the construction of belt sections 39 and 40. The entire assembly is then secured and placed in a press. Teeth are formed in the press by forcing rubber 52 through the patterned cords and into the grooves which are located in the splicing area of mold 38. This operation is quite similar to that described in the formation of belt sections 39 and 40, which operation was illustrated in FIGS. 1 and 2 of the drawings. Fabric 47 (as was fabric 24 in the FIG. 1 operation) is forced ahead of rubber 52 into the grooves to form a jacket fabric about the newly formed teeth. The next operation is to cure the rubber and to remove the joined belt sections from the mold.

The above operation is repeated for the opposite ends of belt sections 39 and 40 and an exceptionally long toothed belt band is formed which has an ultimate breaking tension of from 70% to 90% that of an unspliced belt. The bands are next divided to form the individual toothed belts.

Although the preferred embodiment of the invention is described above, other methods may be used for accomplishing the splicing operation. For example, in the final splicing operation, the tooth stock may be placed into the grooves in mold 38 prior to establishing the cords in their predetermined patterns above the grooves. A body rubber may then be applied over the cords and the assembly vulcanized to form a complete endless belt. This operation would not require the rubber to be forced through the tension cords and into the grooves.

It will be apparent from the foregoing description that the present invention provides a unique method for manufacturing exceptionally long toothed belts. Some of the advantages derived from this unique method are: the pitch line of the tension cord in the spliced area is unaltered; there is constant weight distribution both in the spliced and unspliced areas; the tensile and elongation characteristics of the splice can be made to simulate those of an unspliced belt in the recommended operating areas of the belt, regardless of the tensile member used; an ultimate tensile strength can be obtained for any tensile member which will allow the spliced belt to run efficiently in the recommended operating areas of an unspliced belt; no fasteners or other clamping means are required; the entire finished slab can be ground and cut to uniform thickness and width; and any length belt is possible with a plurality of splices.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true scope and spirit of the invention.

Having thus described our invention, what we claim and desire to protect by Letters Patent is:

1. A method of making an endless transmission belt comprising the steps of: providing a plurality of discontinuous belt sections, each of said sections comprising a rubber body portion with spaced teeth extending transversely thereof and a plurality of tension cords embedded longitudinally in said body portion, the ends of said cords extending outwardly from the ends of said body portion; aligning the ends of said belt sections so that the outermost tooth on each end of each section is spaced a predetermined distance from the outermost tooth on an adjacent section and so that the opposed pairs of corresponding cords overlap; removing portions of said cord ends in a staggered pattern so that said opposed corresponding cords no longer overlap and so that the total length of each pair of said corresponding cords approximates said predetermined distance; embedding said cord ends in rubber to form an endless rubber body portion; and forming spaced transverse teeth on said body portion between said outermost teeth.

2. A method of making an endless transmission belt comprising the steps of: providing a plurality of discontinuous belt sections, each of said sections comprising a rubber body portion with spaced teeth extending transversely thereof and a plurality of tension cords embedded longitudinally in said body portion, the ends of said cords extending outwardly from the ends of said body portion; aligning the ends of said belt sections so that the outermost tooth on each end of each section is spaced a predetermined distance from the outermost tooth on an adjacent section and so that the opposed pairs of corresponding cords overlap; removing portions of the cord ends extending from one of said sections so that said cord ends form a staggered pattern; removing portions of the ends of said corresponding cords so that said pairs of corresponding cords no longer overlap and so that the total length of each pair of said corresponding cords approximates said predetermined distance; embedding said cords in rubber to form an endless rubber body portion; and forming spaced transverse teeth on said body portion between said outermost teeth.

3. The method of claim 2 wherein the ends of said belt sections are aligned by placing said outermost teeth into spaced transverse grooves formed in a flat mold.

4. The method of claim 3 wherein said pairs of corresponding cord ends are arranged in said staggered pattern over additional transverse grooves formed in said flat mold between said outermost teeth; and said spaced transverse teeth are formed by forcing rubber into said additional transverse grooves.

5. The method of claim 4 wherein said rubber is forced into said additional grooves by forcing softened rubber between said cord ends and into said grooves, said rubber thereby forming said teeth and said rubber body portion.

6. A method of making an endless transmission belt comprising the steps of: applying a layer of tension cords to the circumference of a cylindrical mold having axially extending grooves; covering portions of the cords lying over a predetermined number of said grooves; applying a layer of moldable rubber over said tension cords; forcing a portion of said rubber through said layer of tension cords and into said uncovered grooves; curing said rubber; removing the assembly from said mold to thereby provide an endless band having exposed tension cords extending along a predetermined length thereof; severing said exposed cords at approximately their mid-points to thereby provide a discontinuous belt section, said section comprising a rubber body portion with spaced teeth extending tranversely thereof and a plurality of tension cords embedded longitudinally in said body portion, the ends of said cords extending outwardly from the ends of said body portion; repeating the above steps to provide at least one additional discontinuous belt section; aligning the ends of said belt sections so that the outermost tooth on each end of each section is spaced a predetermined distance from the outermost tooth on an adjacent section and so that the opposed pairs of corresponding cords overlap; removing portions of said cord ends in a staggered pattern so that said opposed corresponding cords no longer overlap and so that the total length of each pair of said corresponding cords approximates said predetermined distance; embedding said cord ends in rubber to form an endless rubber body portion; and forming spaced transverse teeth on said body portion between said outermost teeth.

7. The method of claim 6 wherein a layer of circumferentially stretchable fabric is applied to said mold prior to applying said layer of tension cord and the force of said rubber forces said fabric into said grooves to form a wear-resistant jacket for said teeth.

8. The method of claim 7 wherein a metal shim is placed between said fabric and said tension cords over said predetermined number of grooves.

9. The method of claim 8 wherein said cords are covered by placing a rubber-impermeable material between said cords and said rubber in the region of said shim.

10. The method of claim 6 wherein the ends of said belt sections are aligned by placing said outermost teeth into spaced transverse grooves formed in a mold.

11. The method of claim 10 wherein said pairs of corresponding cord ends are arranged in said staggered pattern over additional transverse grooves formed in said mold between said outermost teeth; and said spaced transverse teeth are formed by forcing rubber into said additional transverse grooves.

12. The method of claim 11 wherein said rubber is forced into said additional grooves by forcing softened rubber between said cord ends and into said grooves, said rubber thereby forming said teeth and said rubber body portion.

References Cited
UNITED STATES PATENTS

| | | | |
|---|---|---|---|
| 3,342,656 | 9/1967 | Papageorges | 74—232 XR |
| 3,101,290 | 8/1963 | Paul | 156—159 XR |
| 1,920,525 | 8/1933 | Roderwald. | |
| 2,182,169 | 12/1939 | Bierer | 74—232 |

PHILIP DIER, *Primary Examiner.*

U.S. Cl. X.R.

156—196, 304; 74—232; 24—38; 264—261, 273; 161—38